US012412014B1

(12) United States Patent
Chickermane et al.

(10) Patent No.: US 12,412,014 B1
(45) Date of Patent: Sep. 9, 2025

(54) IC CHIP WITH IC DESIGN MODIFICATION DETECTION

(71) Applicant: Cadence Design Systems, Inc., San Jose, CA (US)

(72) Inventors: Vivek Chickermane, Slaterville Springs, NY (US); Christos Papameletis, Apex, NC (US); Brian Foutz, Charlottesville, VA (US); Krishna V. Chakravadhanula, Vestal, NY (US)

(73) Assignee: Cadence Design Systems, Inc., San Jose, CA (US)

( * ) Notice: Subject to any disclaimer, the term of this patent is extended or adjusted under 35 U.S.C. 154(b) by 576 days.

(21) Appl. No.: 17/900,390

(22) Filed: Aug. 31, 2022

(51) Int. Cl.
*G06F 30/333* (2020.01)
*G06F 11/10* (2006.01)
(Continued)

(52) U.S. Cl.
CPC ............ *G06F 30/333* (2020.01); *G06F 11/10* (2013.01); *G06F 11/14* (2013.01); *G06F 11/16* (2013.01); *G06F 11/27* (2013.01); *G06F 11/273* (2013.01); *G06F 2115/08* (2020.01); *H01L 22/00* (2013.01); *H01L 25/00* (2013.01)

(58) Field of Classification Search
CPC ........ G06F 30/333; G06F 11/10; G06F 11/16; G06F 11/14; G06F 11/27; G06F 11/273; H01L 22/00; H01L 25/00
USPC ....... 716/136, 106, 111; 703/14; 714/30, 33, 714/37, 728, 732, 733, 734, 741; 326/16, 326/41, 101
See application file for complete search history.

(56) References Cited

U.S. PATENT DOCUMENTS 5,574,733 A * 11/1996 Kim ............... G01R 31/318547
714/739
5,737,753 A * 4/1998 Tsuchiya ............... G06F 12/126
711/E12.075
(Continued)

FOREIGN PATENT DOCUMENTS

CN 1329833 C * 8/2007 ..... G01R 31/318536
EP 1678513 B1 * 10/2007 ....... G01R 31/31719
(Continued)

OTHER PUBLICATIONS

Lin, Chinese Patent Document No. CN-108665027-A, published Oct. 16, 2018, 3 pages including abstract, claims and 1 drawing. (Year: 2018).*

*Primary Examiner* — Phallaka Kik
(74) *Attorney, Agent, or Firm* — Foley & Lardner LLP

(57) ABSTRACT

An integrated circuit (IC) chip includes an intellectual property (IP) core that executes logical operations to perform a function. The IC chip also includes a scan chain array for testing the IP core, and a pseudo random pattern generator (PRPG) that provides a pseudo random pattern based on a seed. The IC chip includes a spreader network that applies a first pseudo random code to a first edge of a die of the IC chip and a second pseudo random code to a second edge of the die of the IC chip in response to the pseudo random pattern and combines the first and second code to form a 2D code that is applied to the scan chain array. A security signature register of the IC chip outputs a signature corresponding to a response from the scan chain array that is employable to detect changes to an IC design.

20 Claims, 8 Drawing Sheets

(51) Int. Cl.
    *G06F 11/14*     (2006.01)
    *G06F 11/16*     (2006.01)
    *G06F 11/27*     (2006.01)
    *G06F 11/273*     (2006.01)
    *H01L 25/00*     (2006.01)
    *G06F 115/08*     (2020.01)
    *H01L 21/66*     (2006.01)

(56) References Cited

U.S. PATENT DOCUMENTS

| | | | | |
|---|---|---|---|---|
| 6,021,514 | A * | 2/2000 | Koprowski | G01R 31/318558 714/733 |
| 7,516,441 | B2 * | 4/2009 | Hamilton | G06F 8/34 714/38.14 |
| 7,721,173 | B2 * | 5/2010 | Wang | G01R 31/318547 714/729 |
| 7,757,294 | B1 | 7/2010 | Simkins | |
| 7,877,655 | B2 * | 1/2011 | Le | G01R 31/318502 714/739 |
| 7,913,136 | B2 * | 3/2011 | Gloekler | G01R 31/31855 714/728 |
| 8,015,530 | B1 * | 9/2011 | Sinclair | G06F 30/34 716/113 |
| 8,086,889 | B2 * | 12/2011 | Ito | G01R 31/318552 713/500 |
| 8,214,630 | B2 | 7/2012 | Peterka | |
| 8,468,244 | B2 | 6/2013 | Redlich | |
| 9,405,700 | B2 | 8/2016 | Wingard | |
| 10,184,980 | B2 | 1/2019 | Maheshwari | |
| 2001/0011214 | A1 * | 8/2001 | Shigeki | G06F 30/30 703/22 |
| 2006/0064616 | A1 * | 3/2006 | Rajski | G01R 31/31858 714/726 |
| 2006/0271650 | A1 * | 11/2006 | Kobayashi | G06F 8/20 709/220 |
| 2007/0180413 | A1 * | 8/2007 | Park | G06F 30/33 716/108 |
| 2007/0217444 | A1 * | 9/2007 | Kouhara | G06F 30/30 370/463 |
| 2008/0215920 | A1 | 9/2008 | Mayer | |
| 2010/0250889 | A1 * | 9/2010 | Fang | G06F 12/1027 711/170 |
| 2010/0262819 | A1 * | 10/2010 | Yang | G06F 9/5055 712/30 |
| 2011/0213949 | A1 * | 9/2011 | Jayasimha | G06F 15/173 711/108 |
| 2013/0346818 | A1 * | 12/2013 | Whetsel | G01R 31/318586 714/727 |
| 2014/0006836 | A1 * | 1/2014 | Menon | G06F 1/12 713/400 |
| 2014/0280211 | A1 * | 9/2014 | Rash | G06F 16/24 707/758 |
| 2015/0113346 | A1 * | 4/2015 | Gloekler | G01R 31/318563 714/727 |
| 2018/0218102 | A1 * | 8/2018 | Ledzius | G06F 30/343 |
| 2021/0148977 | A1 | 5/2021 | Bhunia | |
| 2022/0248284 | A1 * | 8/2022 | Jayaraman | G06F 11/1423 |
| 2023/0394209 | A1 * | 12/2023 | Bhunia | G06F 30/327 |

FOREIGN PATENT DOCUMENTS

| | | | |
|---|---|---|---|
| EP | 2 590 368 B1 | 7/2016 | |
| EP | 3 201 821 B1 | 9/2020 | |
| JP | 2002251232 A * | 9/2002 | G06F 1/32 |
| JP | 2005181333 A * | 7/2005 | G01R 31/318385 |
| JP | 5591886 B2 * | 9/2014 | G01R 31/3177 |
| KR | 20000020102 A * | 4/2000 | G11C 29/12 |
| WO | WO-0138889 A1 * | 10/2018 | G01R 31/318547 |

* cited by examiner

IC CHIP WITH IC DESIGN MODIFICATION DETECTION

TECHNICAL FIELD

This disclosure relates to an integrated circuit (IC) chip. More particularly, this disclosure relates to an IC chip with built in logic for detecting a modification to an IC design employed to fabricate the IC chip.

BACKGROUND

In electronic design a semiconductor intellectual property (IP) core, or IP block is a reusable unit of logic, cell or IC chip layout design that is the IP of one party. IP cores may be licensed to another party or can be owned and used by a single party alone. IP cores can be used as building blocks within application-specific integrated circuit (ASIC) designs, field-programmable gate array (FPGA) logic designs or general-purpose processors.

Semiconductor manufacturers have embedded instruments in IC chips to simplify the characterization, testing and debugging of these devices. Given the right standards-based tools environment, these same instruments can perform a much broader spectrum of chip, board and system level validation, test and debug applications. In particular, IC chips include scan chains that are employable design for testing. Scan chains are the elements in scan-based designs that are used to shift-in and shift-out test data. A scan chain is formed by a number of flops connected back to back in a chain with the output of one flop connected to another. The input of first flop (e.g., a head of the scan chain) is connected to the input pin of the chip (called scan-in) from where scan data is fed. The output of the last flop (e.g., a tail of the scan chain) is connected to the output pin of the chip (called scan-out) which is used to take the shifted data out.

SUMMARY

One example relates to an IC chip that includes an IP core that executes logical operations to perform a function. The IC chip also includes a scan chain array for testing the IP core, each scan chain in the scan chain array having an input scan flop and an output scan flop. The IC chip has a pseudo random pattern generator (PRPG) that provides a pseudo random pattern based on a seed. The IC chip further includes a spreader network coupled between the PRPG and the input scan flops of the scan chain array. The spreader network applies a first pseudo random code to a first edge of a die of the IC chip and a second pseudo random code to a second edge of the die of the IC chip in response to the pseudo random pattern. The spreader network also combines the first and second code to form a two-dimensional (2D) code that is applied to the scan chain array. The IC chip has a BLIS security signature register coupled to the output scan flops of the scan chain array that receives a 2D response from the scan chain array that is generated in response to the 2D code. The BLIS security signature register also combines logical values in the 2D response to output a signature for the IP core that corresponds to the seed that is employable to detect changes to an IC design for the IC chip.

Another example relates to a system that includes a non-transitory memory that stores machine-readable instructions and a processing unit that accesses the memory and executes the machine-readable instructions. The machine-readable instructions include a security engine that receives an integrated circuit (IC) chip design. The IC chip design includes an IP core for executing a function and a scan chain array for testing an IC chip based on the IC design. The scan chain array has a plurality of scan chains with input scan flops and output scan flops. The security engine augments the IC design to add built-in logic introduction detection (BLIS) logic for detecting modification of the IP core. The BLIS logic includes a PRPG that provides a pseudo random pattern based on a seed and a spreader network coupled between the PRPG and the input scan flops of the scan chain array. The spreader network applies a first pseudo random code that is applied to a first edge of a die of the IC chip and a second pseudo random code that is applied to a second edge of the die of the IC chip in response to the pseudo random pattern and combines the first and second code to form a 2D code that is applied to the scan chain array. The BLIS logic also includes a BLIS security signature register coupled to the output scan flops of the scan chain array that receives a 2D response from the scan chain array that is generated in response to the 2D code. The BLIS security register also combines logical values in the 2D response to output a signature for the IP core that corresponds to the seed.

Yet another example relates to a method for detecting a modification to an IC design for fabrication. The method includes receiving, by an electronic design automation (EDA) application executing on a computing platform, the IC design. The IC design includes an IP core that executes logical operations to perform a function and a scan chain array for testing the IP core, the scan chain array having scan chains with input scan flops and output scan flops. The method also includes augmenting, by the EDA application, the IC design with BLIS logic. The BLIS logic includes a PRPG that provides a pseudo random pattern based on a seed and a spreader network coupled between the PRPG and the input scan flops of the scan chain array. The spreader network applies a first pseudo random code to a first edge of a die of an IC chip based on the IC design and a second pseudo random code to a second edge of the die of the IC chip in response to the pseudo random pattern. The spreader network also combines the first and second code to form a 2D code that is applied to the scan chain array. The BLIS logic also includes a BLIS security signature register coupled to the output scan flops of the scan chain array that receives a 2D response from the scan chain array that is generated in response to the 2D code and combines logical values in the 2D response to output a signature for the IP core that corresponds to the seed. The method also includes simulating, by the EDA application, the IC design to provide a virtual IC chip based on the IC design. The method further includes applying, by the EDA application, a seed to the PRPG of the virtual IC chip and receiving, by the EDA application, a signature generated by the virtual IC chip in response to a pseudo random pattern generated by the PRPG in response to the seed. The method also includes storing, in BLIS data, a correspondence between the seed and the signature for the IC design.

DETAILED DESCRIPTION

Figure 1:
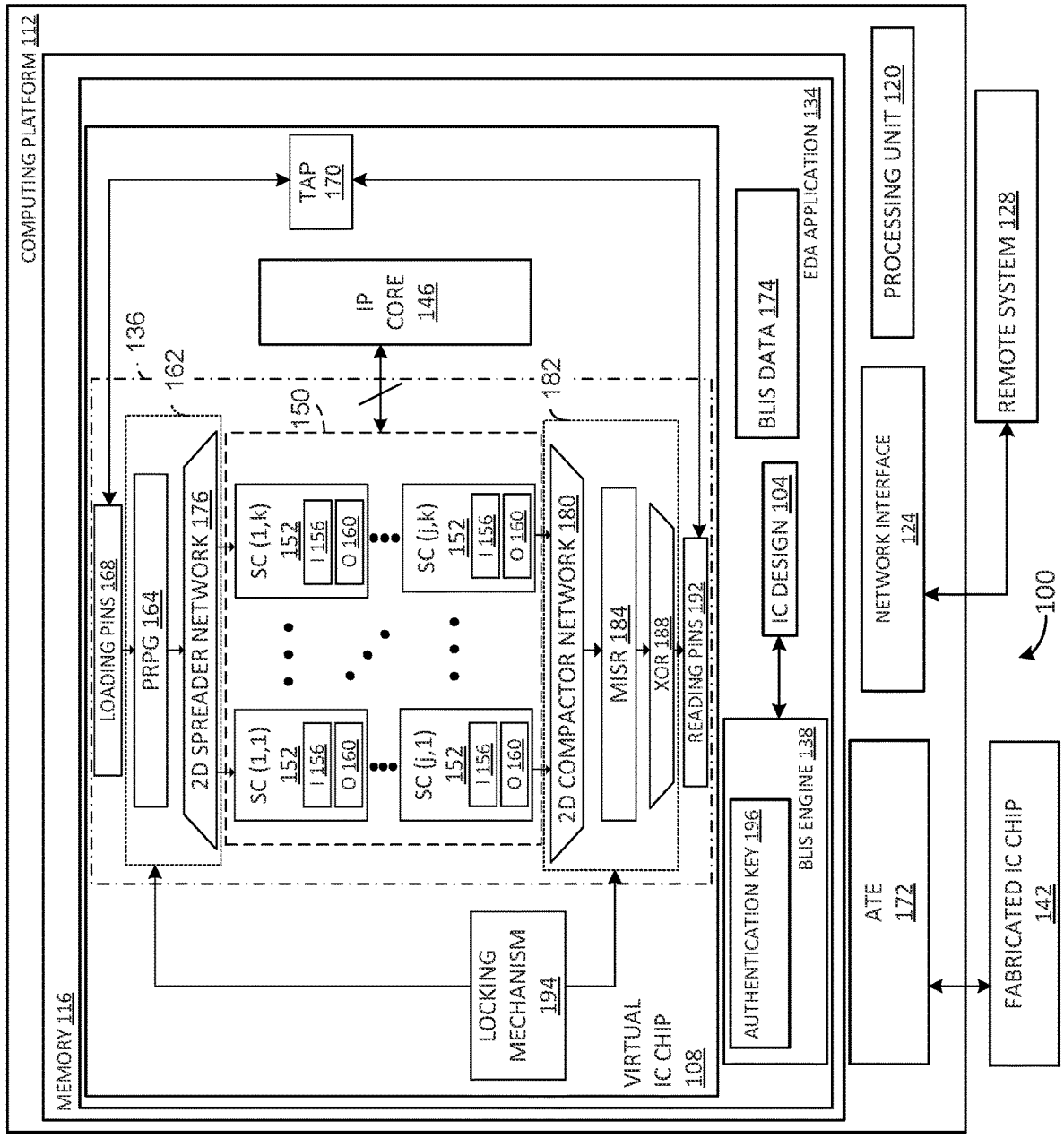
FIG. 1 illustrates an example of a system for augmenting an IC design BLIS logic to detect modifications to the IC design.

This description relates to an IC design for an integrated circuit (IC) chip that includes BLIS logic for detecting modifications to the IC design prior to fabricating the IC chip. The IC chip based on the IC design includes an IP core that executes logical operations to perform a function. The IC chip also include design for test (DFT) elements to test the operation of the IP core. The DFT elements include a scan chain array. The scan chain array is a 2D array of scan chains for testing the IP core. The scan chains in the scan chain array include an input scan flop and an output scan flop. In some examples, a test access port (TAP) is employable to facilitate communication between the scan chains of the scan chain array and an external system to enabling testing of the IP core of the IC chip.

The IC design is augmented to include the BLIS logic that leverages features of the DFT elements, including the scan chain array and the TAP to detect the modifications to the IC design. The BLIS logic includes a BLIS pattern generator that applies pseudo random patterns to the scan chains of the scan chain array and a BLIS security signature register to capture a signature (e.g., a response) for the pseudo random patterns.

More particularly, the BLIS pattern generator includes a pseudo random pattern generator (PRPG) that provides a pseudo random pattern based on a seed. In some examples, the seed is provided to the PRPG from an external system through the TAP. The BLIS pattern generator also includes a spreader network coupled between the PRPG and the input scan flops of the set of scan chains. The spreader network applies a first pseudo random code that is applied to a first edge (e.g., a vertical edge) of a die of the IC chip and a second pseudo random code that is applied to a second edge (e.g., a horizontal edge) of the die of the IC chip in response to the pseudo random pattern. The spreader network also combines the first and second code to form a 2D code that is applied to the scan chain array.

The BLIS security signature register includes a compactor network coupled to the output scan flops of the scan chain array. The compactor network receives a 2D response from the scan chain array that is generated in response to the 2D code. The compactor network also combines logical values in the 2D response to output a signature for the IP core that corresponds to the seed. The BLIS security signature register includes a multiple input signature register (MISR) that captures the signature output by the compactor network.

In some examples, the IC design includes a locking mechanism for controlling communications with the BLIS pattern generator and the BLIS security signature register. The locking mechanism includes a set of locking elements that gate access to input ports of the BLIS pattern generator and to outputs of the BLIS security register and a root of trust (ROT) lock interface (alternatively referred to as a lock interface) that controls a state of the set of locking elements based on a presence or absence of an authentication key. In a locked state, the locking elements block data at an input of a given locking element from reaching an output of the given locking element. In an unlocked state, the locking elements operate as a pass through, allowing data at the input of a given locking element to pass to an output of the given locking element.

The RoT lock interface can be implemented with a cryptoprocessor that stores unlocking codes in an internal secure register. In response to receipt of the authentication key (e.g., provided from an RoT or other trusted entity), the ROT lock attempts to authenticate the authentication key. In response to authentication of the authentication key, the ROT interface provides unlock codes to the set of locking elements to transition the locking elements from a locked state to an unlocked state. In situations where the ROT lock interface does not authenticate the authentication key (e.g., because the authentication key is not provided to the ROT lock interface or an inauthentic key, such as a fraudulent key is provided to the ROT lock interface), the ROT lock interface does not provide the unlock codes to the locking elements, such that the locking elements remain in the locked state.

In operation, after the IC design is augmented with the BLIS logic, an electronic design automation (EDA) application can instantiate a virtual IC chip that simulates the operation of the fabricated IC chip. The EDA application can provide the PRPG of the BLIS pattern generator with a seed. In response to the seed, the PRPG generates a pseudo random pattern, and the spreader network shifts the 2D code based on the pseudo random pattern into input scan flops of the scan chains in the scan chain array during scan shift cycles until the scan chains are loaded with the 2D code that corresponds to the pseudo random pattern. Additionally, in response to a launch/capture cycle, the MISR captures the signature output by the compactor network. In this manner, the signature corresponds to the seed and the pseudo random pattern. The EDA application can store the correspondence between the seed and signature in BLIS data. In a similar fashion the EDA application can generate multiple seeds and capture multiple signatures generated in response to these seeds.

Subsequently, the IC design can be released for fabrication. In some examples, the IC chip can be fabricated in an unsecure facility, sometimes referred to as an "untrusted foundry". In this situation, if the IC design is modified in an unauthorized manner to add or remove logic from the IP core prior to fabrication of the IC chip, the resultant fabricated IC chip would output a different signature than the signature generated by the virtual IC chip. Stated differently, for a given seed, the virtual IC chip (based on the unmodified IC design) would provide a first signature, and the fabricated IC chip (based on the modified IC design) would provide a second signature, such that the signature of the fabricated IC chip would reveal that the IC design had been modified.

Thus, inclusion of the BLIS logic and the locking mechanism curtails unauthorized modifications to the design logic of the IP core. In particular, the BLIS logic and the locking mechanism are employable to impeded and/or prevent IP theft, security information theft, scan based attacks, trojan injection, reverse engineering, cloning, etc. because modifications to the IP core (e.g., the adding and/or removal of gates) prior to fabrication of the IC chip would be detectable. Additionally, the locking mechanism prevents unauthorized use of the BLIS logic. Moreover, because the BLIS logic leverages DFT elements (e.g., the scan chain array and the TAP), including the BLIS logic does not substantially impact the design flow of the IC chip and/or the performance power or area of the IC chip.

FIG. 1 illustrates an example of a system 100 for adding built in logic instruction detection to an IC design 104 that could be represented as a virtual IC chip 108. The system 100 can include a computing platform 112. Accordingly, the computing platform 112 can include a memory 116 for storing machined readable instructions and data and a processing unit 120 for accessing the memory 116 and executing the machine-readable instructions. The memory 116 represents a non-transitory machine-readable memory (or other medium), such as random access memory (RAM), a solid state drive, a hard disk drive or a combination thereof. The processing unit 120 can be implemented as one or more processor cores. The computing platform 112 can include a network interface 124 (e.g., a network interface card) configured to communicate with other computing platforms via a network, such as a public network (e.g., the Internet), a private network (e.g., a local area network (LAN)) or a combination thereof (e.g., a virtual private network).

The computing platform 112 could be implemented in a computing cloud. In such a situation, features of the computing platform 112, such as the processing unit 120, the network interface 124 and the memory 116 could be representative of a single instance of hardware or multiple instances of hardware with applications executing across the multiple of instances (i.e., distributed) of hardware (e.g., computers, routers, memory, processors or a combination thereof). Alternatively, the computing platform 112 could be implemented on a single dedicated server or workstation.

The IC design 104 can be stored in the memory 116 of the computing platform 112. The IC design 104 can be implemented, for example, as design specifications for an IC chip. The IC design 104 can be generated with an EDA application operating on a remote system 128, such as a logic synthesis application (e.g., a synthesis tool). For instance, an end-user of the EDA application can employ a user-interface to generate and/or modify hardware description language (HDL) code (e.g., Verilog) for generating a register-transfer level (RTL) model (e.g., RTL code) characterizing a circuit, wherein the RTL model is transformable by an EDA application into a physically realizable gate-level netlist for the IC design 104. In the examples described, the virtual IC chip 108 represents a simulated instantiation of the IC design 104.

The memory 116 can include an EDA application 134. The EDA application 134 can be, for example a DFT EDA application. The EDA application 134 analyzes the IC design 104 to provide the virtual IC chip 108 as a simulation. The EDA application 134 is configured/programmed to augment the IC design 104 with features to enable BLIS logic 136 to operate within the IC design 104. In particular, the EDA application 134 can include a BLIS engine 138 that is configured to augment the IC design 104 with the BLIS logic 136 that provides logic features to detect modifications in the IC design 104 for fabrication on a fabricated IC chip 142 that is based on the IC design 104. Unless otherwise stated the virtual IC chip 108 represents a digital twin of the fabricated IC chip 142. That is, it is presumed that the fabricated IC chip 142 includes the same features as those illustrated with respect to the virtual IC chip 108.

More particularly, the virtual IC chip 108 includes an IP core 146 (alternatively referred to as an IP block). While FIG. 1 illustrates a single IP core 146, in many instances, there can be virtually any number of IP cores 146 (e.g., hundreds, thousands or millions). The IP core 146 can represent a logic block that executes a particular function or multiple functions. In some examples, the IP core 146 can be provided by a third-party developer or could be designed by the end-user that generated the IC design 104. In some examples, internal operations of the IP core 146 are known to the end-user. In other examples, such internal operations some (or all) of the IP core 146 are obfuscated.

The IC design 104 includes a scan chain array 150 (alternatively referred to as a set of scan chains 152 or a matrix of scan chains 152). There the scan chain array 150 includes j rows and k columns of scan chains 152, where j and k are integers greater than or equal to one, such that there are j×k (j times k) number of scan chains 152. Thus, each scan chain 152 includes a two-dimensional index number that uniquely identifies the scan chain 152. For instance, the scan chain (1, 1) 152 refers to the scan chain 152 that is located at row 1, column 1. Similarly, scan chain (j, 1) 152 refers to the scan chain located at row j, column 1. Each scan chain 152 in the scan chain array 150 includes an input scan flop 156 (alternatively referred to as a head of the respective scan chain 152) and an output scan flop 160 (alternatively referred to as a tail of the scan chain 152).

In some examples, the EDA application 134 adds the scan chain array 150. In other examples, the scan chain array 150 is already present in the IC design 104 provided to the EDA application 134. Each scan chain 152 in the scan chain array 150 communicates with the IP core 146. The scan chains 152 in the scan chain array 150 are formed with storage elements and flip flops that are configured into multiple shift registers in situations where the virtual IC chip 108 and/or the fabricated IC chip 142 are operating in a test mode. The scan chains 152 have about 200 to about 1000 scan elements. In various examples, the IC design 104 can be millions of components (e.g., flip flops), and in such examples, there can be one million or more scan chains 152 in the scan chain array 150. Test data encoded in test patterns is shifted to the scan chains 152 during shift cycles. Once the test data is loaded with the test patterns (and the shift cycles are completed), the next clock cycle (or multiple clock cycles) are referred to as a launch-capture cycle that is employable to capture an logical values at the output scan flop 160 of the scan chains 152. Stated differently, the scan chain array 150 can be loaded with test data (e.g., test patterns) at each respective input scan flop 156, and new data is shifted in with each shift clock cycle. In response to loading the scan chains 152, the virtual IC chip 108 or the fabricated IC chip 142 is clocked for one or more clock signals, to enable new values in the scan chains 152 to be captured from the respective output scan flops 160, and test responses (e.g. generated by the IP core 146) are unloaded.

The BLIS logic 136 includes a BLIS pattern generator 162 for generating and distributing a pseudo random pattern to the scan chain array 150. The BLIS pattern generator includes a PRPG 164 that can includes a built in linear feedback shift register (LFSR). The PRPG 164 can generate a pseudo random pattern at each shift clock cycle during intervals of time that the IC design 104 and/or the fabricated IC chip 142 are operating in the test mode. The PRPG 164 generates the random pattern based on a seed, which corresponds to a logical value received at loading pins 168. In some examples, the seed is provided to the virtual IC chip 108 by the BLIS engine 138, and the fabricated IC chip 142 is provided the seed from automatic test equipment (ATE) 172. In some examples, the EDA application stores the seed in BLIS data 174 that is stored in the memory 116.

In some examples, the IC design 104 include a TAP 170 coupled to the loading pins 168 that can provide an interface for external systems to provide stimuli to the components an IC chip, such as the virtual IC chip 108 or the fabricated IC chip 142. The TAP 170 can conform to the standards set forth in the Institute for Electrical and Electronics Engineers (IEEE) 1500 standards. Thus, the TAP 170 is a controller configured to generate the control signals employed to control the BLIS logic 136, including providing the seed generated at an external system to the loading pins 168. In some examples, the TAP 170 provides commands in a format set forth in the IEEE 1500 serial scan test standard also known as the Joint Test Action Group (JTAG) protocol. The TAP 170 is alternatively referred to as a TAP module.

The random pattern is applied to a two-dimensional (2D) spreader network 176 of the BLIS pattern generator. The 2D spreader network 176 is formed with a 2D array of XOR gates that operate to apply a G bit code to the scan chains 152 of the scan chain array 150 in response to each pseudo random pattern provided from the PRPG 164, where G is an integer equal to j×k (e.g., equal to the number of scan chains 152 in the scan chain array 150). More particularly, the 2D compactor network 176 applies a first pseudo random code to a first edge of a die of an IC chip (e.g., the fabricated IC chip 142) based on the IC design 104 and a second pseudo random code to a second edge of the die of the IC chip in response to the pseudo random pattern. Additionally, the 2D spreader network 176 combines the first and second code to form a 2D code, namely the G bit code, that is applied to the scan chain array 150.

Figure 2:
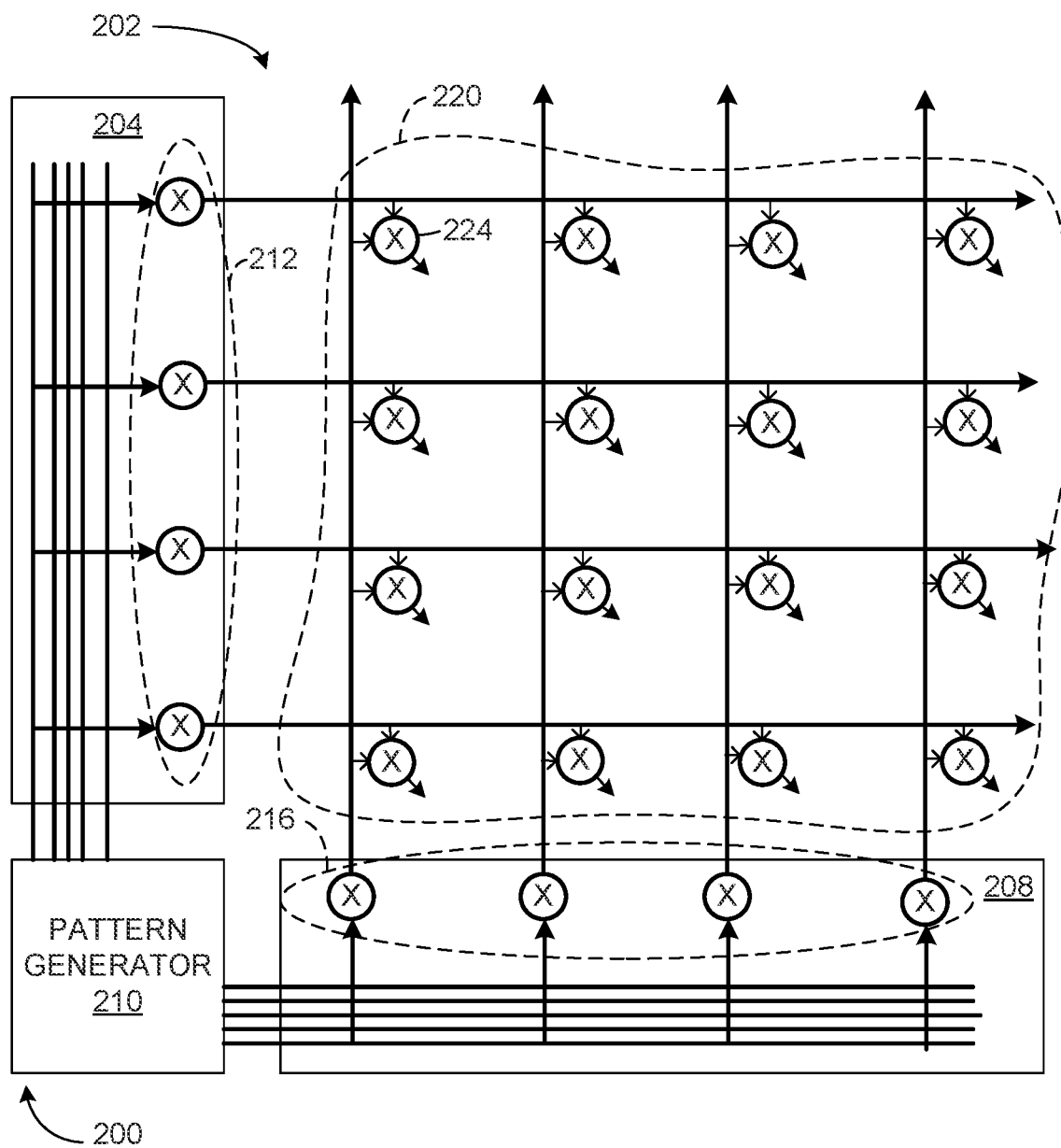
FIG. 2 illustrates an example of a BLIS pattern generator.

FIG. 2 illustrates an example of a BLIS pattern generator 200 that is employable to implement the BLIS pattern generator 162 of FIG. 1. The BLIS pattern generator 200 includes a 2D spreader network 202 that is formed with j number of rows and k number of columns, where j and k are equal to the j and k values described with respect to FIG. 1. In the example illustrated, there are four rows and four columns, but in other examples, there could be more or less rows and columns in the 2D spreader network 202. The 2D spreader network 202 includes a row spreader network 204 and a column spreader network 208. The row spreader network 204 and the column spreader network 208 both receive given pseudo random pattern from a pattern generator 210 (e.g., the PRPG 164 of FIG. 1) of the BLIS pattern generator 200. That is, the row spreader network 204 and the column spreader network 208 receive the same pseudo random pattern.

The row spreader network 204 includes a first set of XOR gates 212 that are arranged to receive two bits of the given pseudo random pattern as inputs and output a bit on a corresponding row of the 2D spreader network. Thus, the first set of XOR gates 212 provide a four bit (one bit per row) signal on the four rows of the 2D spreader network 202. The inputs to each the first set of XOR gates 212 can vary from instance to instance of the 2D spreader network 202. More generally, the row spreader network 204 outputs a first pseudo random code having a first bit length (e.g., the j number of rows of the scan chain array 150) in response to the given pseudo random pattern along a first set of signal paths (e.g., rows of the 2D spreader network 202) that extend in a horizontal direction (e.g., a first direction).

The column spreader network 208 includes a second set of XOR gates 216 that are arranged to receive two bits of the given pseudo random pattern as inputs and output a bit on a corresponding column of the 2D spreader network. Thus, in the second set of XOR gates 212 provide a four bit (one bit per column) signal on the four rows of the 2D spreader network 202. The inputs to each XOR gate in the second set of XOR gates 212 can vary from instance to instance of the 2D spreader network 202. More generally, the column spreader network 208 provides a second pseudo random code having a bit length of k (the number of columns of the scan chain array) in response to the pseudo random pattern along a second set of signal paths (the signal paths for the columns of the 2D spreader network 202) that extend in a vertical direction (e.g., a second direction) normal to the horizontal direction. The BLIS pattern generator 200 is rotatable such that the horizontal direction and the vertical direction are changeable based on a selected orientation.

A third set of XOR gates 220 are situated at the intersection of each row and column of the 2D spreader network 202. Moreover, the XOR gates in the third set of XOR gates 220 are configured to receive a bit from a corresponding row and a corresponding column as an input. Moreover, an output of each XOR gate in the third set of XOR gates 220 is applied to an input of a scan chain, such as one of the j×k (j times k) number of scan chains 152 in the scan chain array 150 of FIG. 1. For instance, an XOR gate 224 in the third set of XOR gates 220 is logically situated at the intersection of the first row and the first column and applies XOR logic to the bit on the first row output by the row spreader network 204 and the bit on the first column output by the column spreader network 208. The XOR gate 224 would output a logical value to an input of a scan chain, such as the input scan flop 156 of the scan chain (1, 1) 152 of FIG. 1.

The 2D spreader network 202 is configured such that the given pseudo random pattern shifts along the scan chains (e.g., the scan chains 152 in the scan chain array 150) until the scan chain chains are fully loaded. Moreover, by employment of the BLIS pattern generator 200, a unique, 2D code (e.g., a j×k bit code, such as the G bit code of FIG. 1) is output to the scan chains in response to each random pattern provided by the pattern generator.

Referring back to FIG. 1, responses to the pseudo random pattern are provided at the output scan flop 160 of each scan chain 152 in the scan chain array 150. During the test mode, the launch-capture cycle (alternatively referred to as a capture cycle) causes the scan chain array 150 to unload responses at corresponding output scan flops 160. These responses are provided to a 2D compactor network 180 of a BLIS security signature register 182. Stated differently, the BLIS security signature register 182 is coupled to the output scan flops 160 of the scan chain array 150. The BLIS security signature register 182 includes an XOR network 188 for generating a signature for the IP core 146 that is provided to reading pins 192. The 2D compactor network 180 is formed with a 2D array of XOR gates that operate to receive a G bit response code from the scan chain array 150 (e.g., one bit at the output scan flop 160 of each scan chain 152) that is generated in response to each pseudo random pattern applied by the 2D spreader network 176 (alternatively referred to as a spreader network). The 2D compactor network 180 converts the G bit response code into an H bit signature, where H is a positive integer that is less than G. More generally, in operation, the BLIS security signature register 182 receives a 2D response, namely, the G bit response from the scan chain array 150 that is generated in response to the G bit code (e.g., a 2D code) applied by the 2D spreader network 176. The BLIS security signature register 182 combines logical values in the 2D response to output the H bit signature for the IP core 146 that corresponds to the seed.

The H bit signature is provided to a multiple input signature register (MISR) 184 of the BLIS security signature register 182. The TAP 170 can unload signatures at the reading pins 192, and provide these signatures to an external system, such as the EDA application 134.

Figure 3:
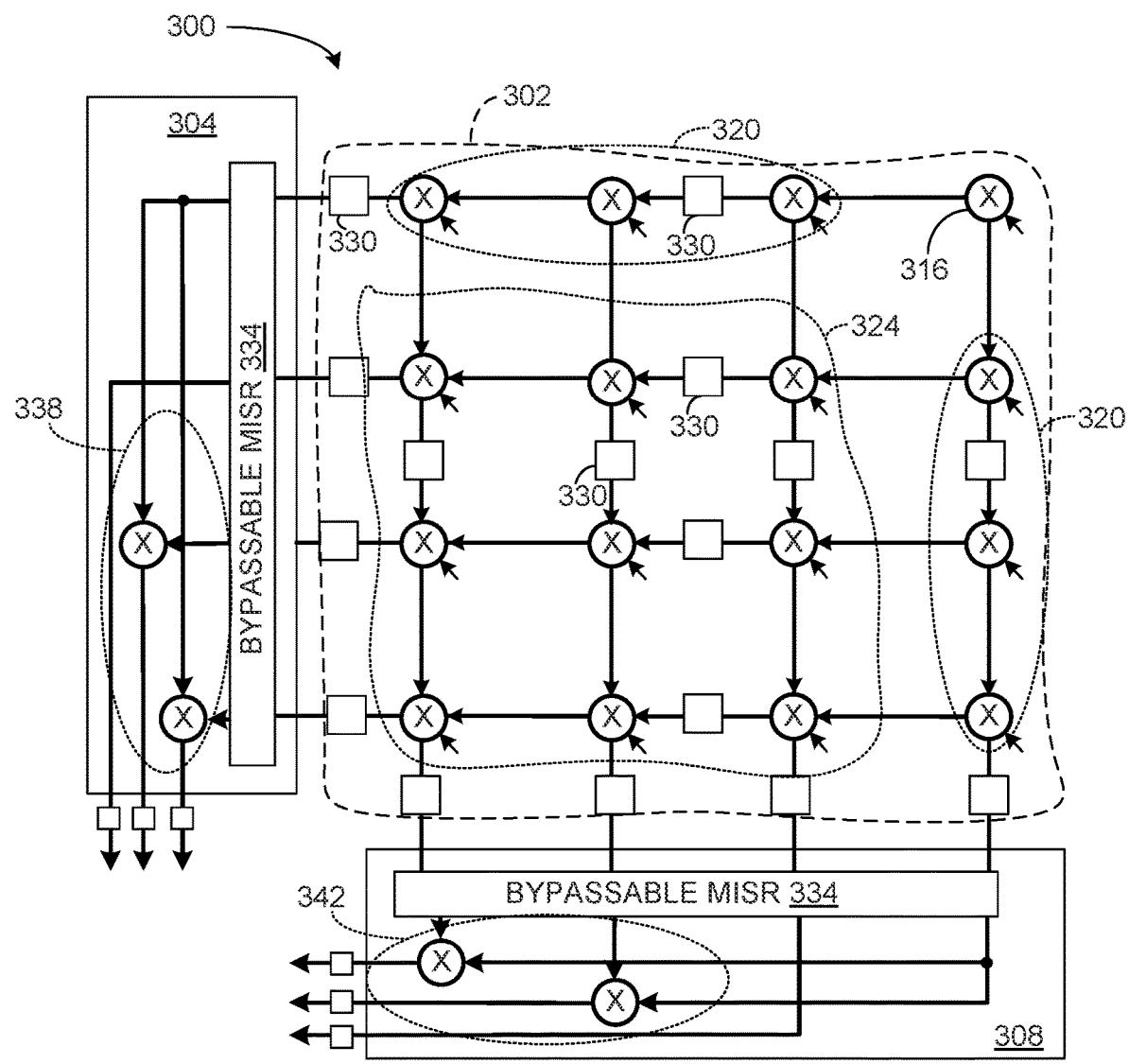
FIG. 3 illustrates an example of a BLIS security signature register.

FIG. 3 illustrates an example of a BLIS security signature register 300, that is employable to implement the BLIS security signature register 182. The BLIS security signature register 300 includes a 2D compactor network 302 that is employable to implement the 2D compactor network 180 of FIG. 1. The 2D compactor network 302 is formed with j number of rows and k number of columns, where j and k are equal to the j and k values described with respect to FIG. 1. In the example illustrated, there are four rows and four columns, but in other examples, there could be more or less rows and columns in the 2D compactor network 302. The BLIS security signature register 300 includes a row compactor network 304 and a column compactor network 308 that are employable to implement a combination of the MISR 184 and the XOR network 188 of FIG. 1. The row compactor network 304 is configured to receive a first code from the 2D spreader network 302. The first code is a j bit code, such that in the example provided, the first code is a four bit code. In this manner, the row compactor network 304 receives signals propagating along a first set of signal paths that extend in the a horizontal direction (e.g., a first direction). The column compactor network 308 is configured to receive a second code from the 2D compactor network 302. The second code is a k bit code, such that in the example provided, the second code is a four bit code. In this manner, the column compactor network 308 that receives signals propagating along a second set of signal paths that extend in a vertical direction (e.g., a second direction). The BLIS security signature register 300 is rotatable such that the horizontal direction and the vertical direction are changeable based on a selected orientation.

The 2D compactor network 302 includes XOR gates with input coupled to a respective output of a scan chain, and outputs coupled to a row and a column of the 2D compactor network 302. That is, each XOR gate of the 2D compactor network 302 provides the output to a respective row and column of the 2D compactor network 302. More particularly, the 2D compactor network 302 includes a set of XOR gates arranged to receive logical values output by scan chains, such as the output scan flops 160 of the scan chains 152 in the scan chain array 150. A first XOR gate 316 in the 2D compactor network (e.g., alternatively referred to as a first subset of XOR gates) receives an output from a respective scan chain (e.g., scan chain (1, k) 152 of FIG. 1), and provides an input to two adjacent XOR gates. The first XOR gate 316 is logically situated at a corner of the 2D compactor network 302. A second subset of XOR gates 320 of the set of XOR gates in the 2D compactor network 302 receive an output of a scan chain and an output from a neighboring XOR gate. A third subset of XOR gates 324 (e.g., the remaining XOR gates) of the XOR gates in the 2D compactor network 302 receive an output from a respective scan chain and an input from two neighboring XOR gates (e.g., from a neighboring XOR gate to the top and to the right in the orientation illustrated).

The 2D compactor network 302 also includes pipeline stages 330 (only some of which are labeled). The pipeline stages 330 compensate for signal propagation delay due to trace line length within a corresponding IC chip.

The row compactor network 304 and the column compactor network 308 include a by-passable MISR 334 (or multiple by-passable MISRs) that represent the MISR 184 of FIG. 1. The row compactor network 304 also includes a second set of XOR gates 338 for converting the j bit code into an H/2 bit code that represent a portion of the XOR network 188. In the example illustrated, the second set of XOR gates 338 convert the four bit code (corresponding to the four rows of the 2D compactor network 302) into a three bit code, which forms a first portion of a signature. Similarly, the column compactor network 308 includes a third set of XOR gates 342 that represent another portion of the XOR network 188 of FIG. 1 for converting the k bit code into an H/2 bit code. In the illustrated example, the third set of XOR gates 342 converts the four bit code (corresponding the four columns of the 2D compactor network 302) into a three bit code, which forms a second portion of the signature. The combined first portion and second portion of the signature are output by the row compactor network 304 and the 2D compactor network 302, respectively.

In operation, at each scan shift cycle, a corresponding IC chip response is computing across each row and down each column. A LFSR included in the by-passable MISR 334 of the row compactor network 304 and the column compactor network 308 accumulates the signature.

Figure 4:
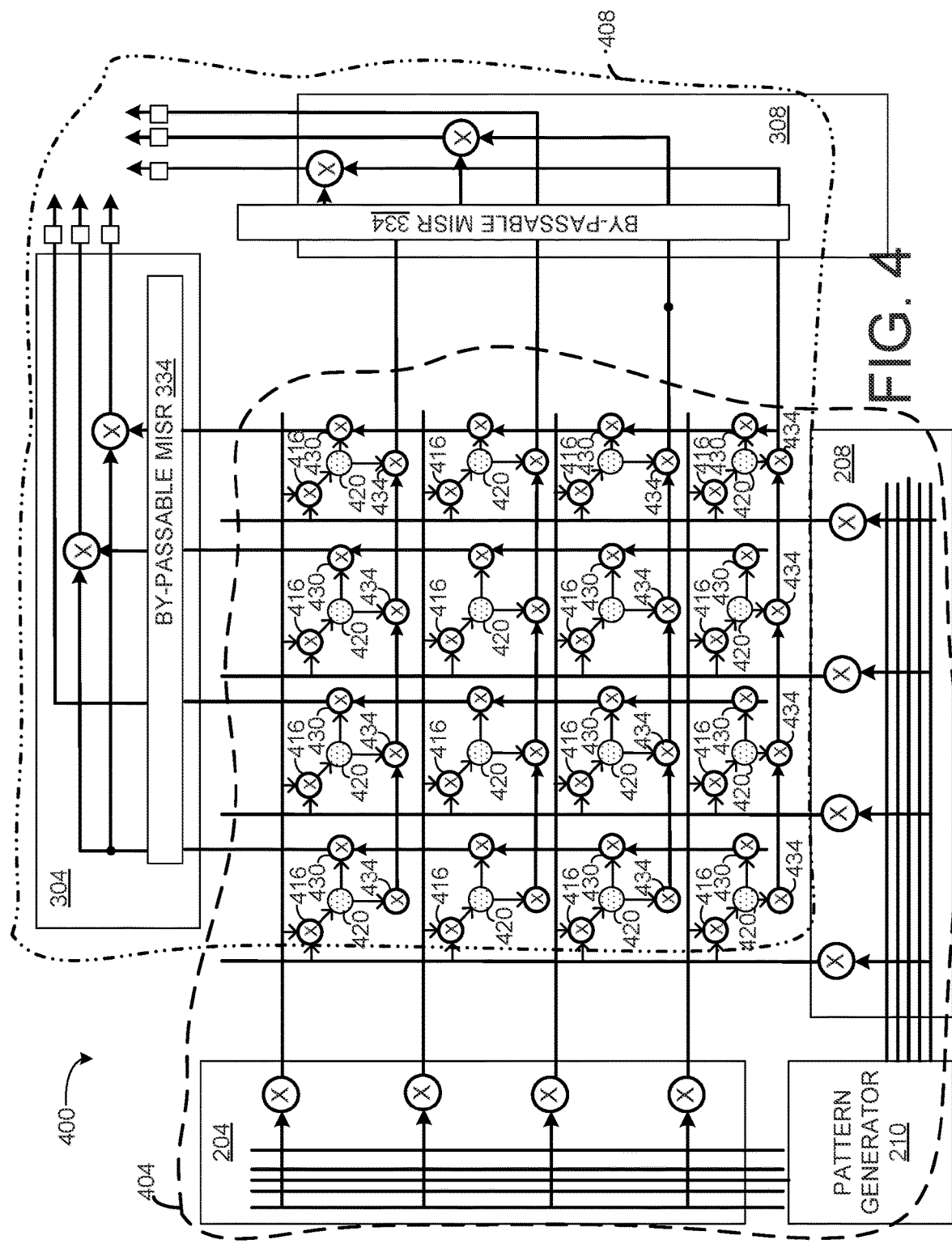
FIG. 4 illustrates a logic intrusion network that includes a combination of a BLIS pattern generator and a security signature register.

FIG. 4 illustrates a logic intrusion network 400 that includes a combination of a BLIS pattern generator 404 (e.g., the BLIS pattern generator 200 of FIG. 2) and a security signature register 408 (e.g., the BLIS security signature register 300 of FIG. 3). Thus, for purposes of simplification of explanation, FIGS. 2-4 employ the same reference numbers to denote the same structures. The BLIS pattern generator 404 includes a pattern generator 210 that provides a given pseudo random pattern to a row spreader network 208 and to a column spreader network 208 during scan shift cycles.

Responsive to the given pseudo random pattern, the row spreader network 204 outputs a logical value to j rows (four rows in the illustrated example) of signal paths extending in a horizontal direction (e.g., a first direction) and the column spreader network 208 outputs a logical value to k columns (four columns in the illustrated example) of signal paths extending in a vertical direction (e.g., a second direction). XOR gates 416 are logically situated at intersections of the j rows and the k columns to receive inputs from the rows and columns provided by the row spreader network 208 and the column spreader network 208. The XOR gates 416 output logical values to inputs of scan chains 420 (e.g., the input scan flops 156 of FIG. 1). Thus, the XOR gates 416 are arranged to operate in the same manner as the set of XOR gates 220 of FIG. 2.

Responsive to the logical values provided by the XOR gates 416, an output of the scan chains 420 (e.g., the output scan flops 160 of FIG. 1) provide a logic value to two XOR gates 430 and 434 (the logical value is output to a row and a column). Thus, the XOR gates 430 and 434 operate in the same manner as the 2D compactor network 302 of FIG. 3.

The security signature register 408 includes a row compactor network 304 that receives signals propagating along signal paths extending in the vertical direction (e.g., the second direction) and a column compactor network 308 that receives signals propagating along signal paths extending in the horizontal direction (e.g., the first direction). The row compactor network 304 and column compactor network 308 include a by-passable MISR 334 with an LFSR to output a respective first and second portion of a signature in response to the capture cycle.

Referring back to FIG. 1, different seeds loaded applied to the loading pins 168 of the virtual IC chip 108 through the TAP 170 result in different signatures at the reading pins 192. More particularly, the BLIS engine 138 (or a different module in the EDA application 134) can generate seeds for the PRPG 164 that are provided to the PRPG 164 through the TAP 170, resulting in pseudo random test patterns being applied to the scan chain array 150. Moreover, responses to these pseudo random test patterns are converted to signatures, and these signatures are unloaded by the TAP 170 and provided to the EDA application 134. The EDA application 134 can store these signatures along with associated seeds and recorded by the EDA application 134 and in the BLIS data 174.

After the BLIS logic 136 is added to the IC design 104, the IC design 104 is deployed for fabrication to form instances of the fabricated IC chip 142. In some examples, the IC design 104 is deployed to third party foundries (referred to as untrusted foundries) for fabrication. In a first example (hereinafter, "the first example"), suppose the fabricated IC chip 142 is fabricated based on an unmodified version of the IC design 104 (as would be authorized). Thus, at a subsequent time, the ATE 172 can provide the seeds for the PRPG 164, and the PRPG 164 generates pseudo random test patterns based on the seeds. Moreover, the ATE 172 provides the signature generated by the fabricated IC chip 142 to the EDA application 134. The EDA application 134 compares the signatures to the signatures recorded for the virtual IC chip 108. If the signatures match, there is a high likelihood that the IC design 104 has not been modified. If the signature recorded for the virtual IC chip 108 does not match the signature provided by the fabricated IC chip 142 for the same seed, other instances of the fabricated IC chip 142 can be analyzed in the first example. Because (as stipulated in the first example) the fabricated IC chip 142 is based on an unmodified version of the IC design 104, other instances of the fabricated IC chip 142 would likely have signatures that matched the recorded signatures for the virtual IC chip 108 for the same seed.

Additionally, continuing with the mismatch between the signature of the fabricated IC chip 142 and the virtual IC chip 108 for the same seed would be inconsistent in the first example. That is, due to fabrication imperfections logical mismatches (e.g., due to stuck-at and/or delay defects/faults) in the fabricated IC chip 142 would vary from chip to chip. Thus, two different instances of the fabricated IC chip 142 with different faults/defects would provide two different signatures for the same seed in the first example.

In a second example, (hereinafter, "the second example"), suppose the fabricated IC chip 142 is fabricated based on a modified version of the IC design 104 (as would be unauthorized). For instance, the IP core 146 could be modified to add and/or remove gates prior to fabrication of the fabricated IC chip 142 in the second example. Thus, at a subsequent time, the ATE 172 can provide the seeds for the PRPG 164, and the PRPG 164 generates pseudo random test patterns based on the seeds. Moreover, the ATE 172 provides the signature generated by the fabricated IC chip 142 to the EDA application 134. The EDA application 134 compares the signatures to the signatures recorded for the virtual IC chip 108. In the second example, because of the modification, the signatures are unlikely to match, indicating that there is a high likelihood that the IC design 104 was modified in an unauthorized manner. Moreover, because (as stipulated in the second example) the fabricated IC chip 142 is based on an modified version of the IC design 104, other instances of the fabricated IC chip 142 would likely have the same signatures for the same seed, and these signatures would not match the recorded signatures for the virtual IC chip 108 for the same seed. Thus, the EDA application 134 would be able to detect the unauthorized modification of the IC design 104.

Furthermore, in some examples, the BLIS engine 138 can augment the IC design 104 to add a locking mechanism 194 to prevent unauthorized access and/or use of the BLIS logic 136. The locking mechanism 194 is formed with a RoT locking interface and a set of locking elements to gate access to inputs of the BLIS pattern generator 162 and outputs of the BLIS security signature register 182 based on the presence or absence of an authorization key 196.

Figure 5:
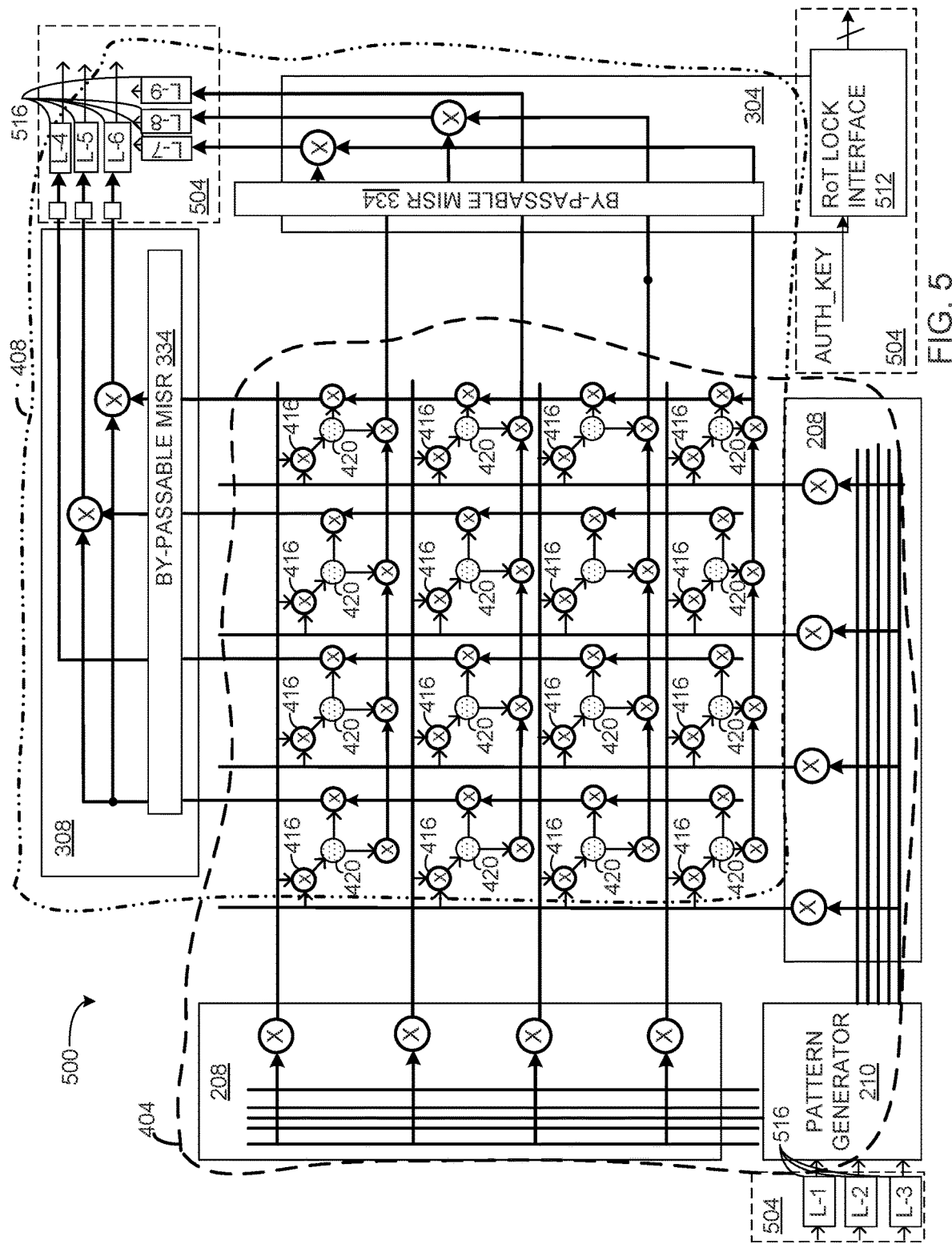
FIG. 5 illustrates another logic intrusion network with a locking mechanism.

FIG. 5 illustrates another a logic intrusion network 500 with a locking mechanism 504 that include the BLIS pattern generator 404 (e.g., the BLIS pattern generator 200 of FIG. 2) and the security signature register 408 (e.g., the security signature register 300 of FIG. 3). Thus, for purposes of simplification of explanation, FIGS. 2-5 employ the same reference numbers to denote the same structures, and some structures are not re-introduced.

The locking mechanism 504 is employable to implement the locking mechanism 194 of FIG. 1. The locking mechanism 504 includes an RoT locking interface 512 and P number of locking elements 516, where P is an integer greater than or equal to one. In the example illustrated, there are nine locking elements (L-1 . . . . L-9) 516, but in other examples, there can be more or less locking elements 516.

Each locking element 516 receives an input signal at an input, and provides an output signal. The first to third Locking elements 516 (L-1 . . . . L-3) gate the input to the pattern generator 210. Moreover, the fourth to ninth locking elements 516 (L4-L9) gate an output of the row compactor network 304 and the column compactor network 308. In an unlocked state, the locking elements 516 operate as a pass through, and pass a logical value at the input to the output. In a locked state, the locking elements 516 provide a logical value that is independent of the logical value at the input. The RoT locking interface 512 controls a state of the locking elements 516 based on the presence or absence of an authentication key (AUTH_KEY).

The authentication key can be provided from a RoT or other entity. In response to receipt of the authentication key, the ROT locking interface 512 attempts to authenticate the authenticity key. If the ROT locking interface 512 authenticates the authentication key successfully, the ROT locking interface 512 provides an unlock code to the locking elements 516 (the connection between the ROT locking interface 512 and the locking elements 516 is omitted for clarity). In response to the unlock code, the locking elements 516 transition from the locked state to the unlocked state. Conversely, if the authentication key is not provided (or an inauthentic version of the authentication key is provided), the ROT locking interface 512 does not provide the unlock code to the locking elements 516, and the locking elements 516 operate in the locked state.

Figure 6:
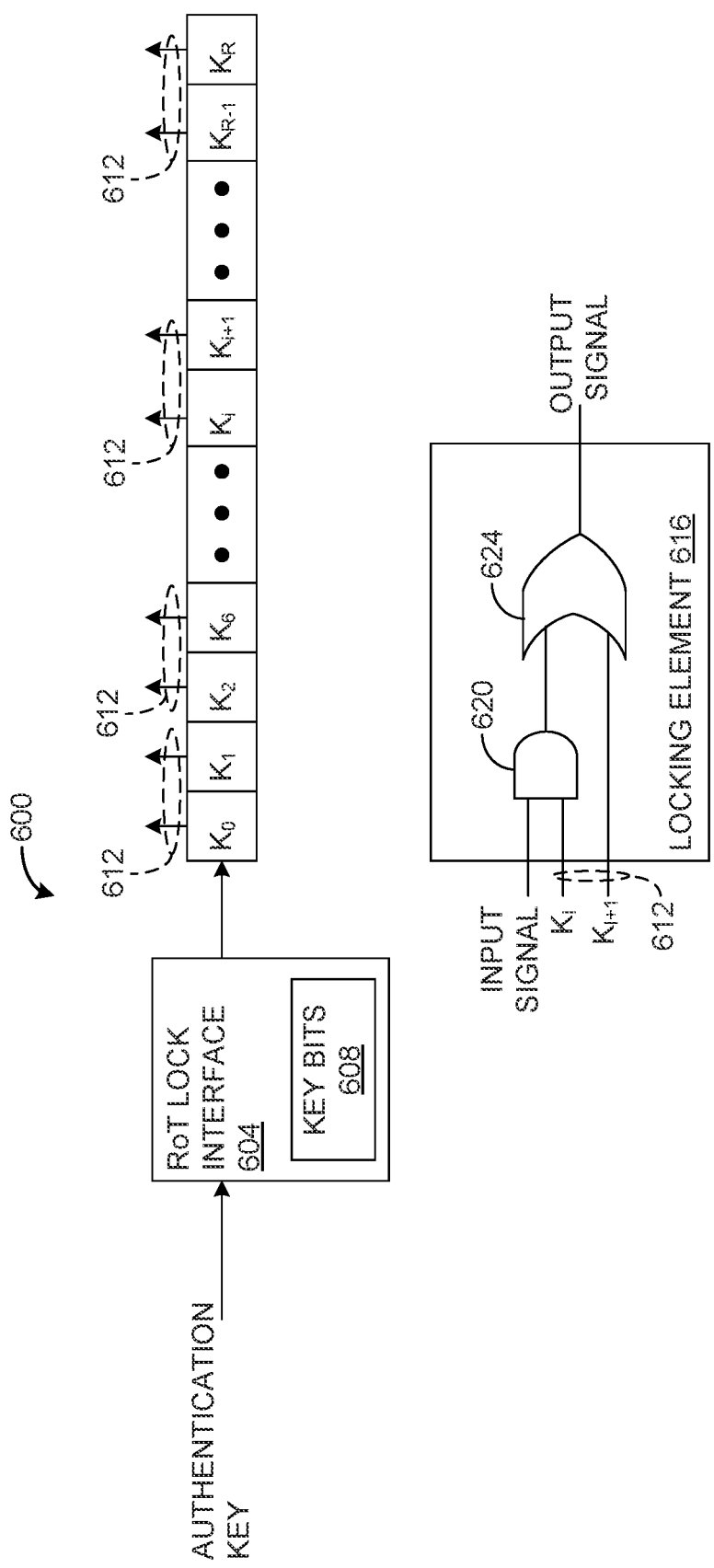
FIG. 6 illustrates an example of a locking mechanism.

FIG. 6 illustrates an example of a locking mechanism 600 that is employable to implement the locking mechanism 194 of FIG. 1. The locking mechanism 600 includes an ROT lock interface 604, such as the RoT lock interface 512 of FIG. 5. The ROT lock interface 604 can be implemented with a secure cryptoprocessor, such as a TPM.

The RoT lock interface 604 is configured to receive an authentication key from an external source, such as an RoT. The authentication key can be implemented with the authentication key 196 of FIG. 1, and the authentication key can be implemented as a digital signature of the RoT. In response to receipt of the authentication key, the ROT lock interface 604 is configured to verify an authenticity of a sender (e.g., the RoT) of the authentication key.

If the authentication of the authentication key is successful, the ROT lock interface 604 is configured to output a stream of key bits 608 stored in a secure memory (e.g., a secure internal shift register) of the ROT lock interface 604. The key bits 608 include R number of bits, labeled $K_0$ . . .

$K_R$ that are patterned to unlock P number of locking elements (e.g., the nine locking elements 516 in FIG. 5), where R is an integer greater than or equal to two.

The R number of bits in the key bits 608 are arranged as P number of bit pairs 612 (e.g., sequential bits), where P is an integer greater than or equal to one and less than R. Each bit pair 612 corresponds to an unlock code that is provided to a locking element 616. As is illustrated, each bit pair 612 includes a first bit (e.g., bit $K_i$) and a second bit that is a next (e.g., sequential) bit in the key bits 608 (e.g., bit $K_{i+1}$).

Conversely, in situations where the authentication key is not received at the RoT lock interface 604 and/or the authentication key cannot be verified, the ROT lock interface 604 is configured to output a sequence of bits to the locking elements 616 that provide a lock code. The lock code can be any string of bits (e.g., selected pseudo randomly or as a stream of logical 0's or logical 1's) other than the stream of bits encoded in the key bits 608. Accordingly, any code other than the unlock code is equivalent to the lock code.

The locking element 616 illustrated in the locking mechanism 600 receives a bit pair 612, namely bit $K_i$ and bit $K_{i+1}$. The locking element 616 also receives an input signal (e.g., a data signal). The locking element 616 provides an output signal. The input signal is provided to a first input of an AND gate 620 of the locking element 616, and the bit $K_i$ of the bit pair 612 is provided to a second input of the AND gate 620. An output of the AND gate 620 is provided to a first input of an OR gate 624, and the bit $K_{i+1}$ of the bit pair 612 is provided to the second input of the OR gate 624. An output of the OR gate 624 provides the output of the locking element 616. Table 1 characterizes an output of the locking element 616.

TABLE 1

| $K_i$ | $K_{i+1}$ | Lock Element Output |
| --- | --- | --- |
| 0 | 0 | Locked to 0 |
| 0 | 1 | Locked to 1 |
| 1 | 0 | Unlocked-Input signal passed through |
| 1 | 1 | Locked to 1 |

As illustrated in Table 1, the unlock code for the locking element 616 is $K_i=1$ and $K_{i+1}=0$. Thus, as illustrated in Table 1, if the bit pair 612 has any value other than $K_i$ being a logical 1 and $K_{i+1}$ being a logical 0, the output signal of the locking element 616 has a constant (locked) value (e.g., a logical 0 or a logical 1). In this manner, the ROT lock interface 604 and the locking element 616 of the locking mechanism 600 operate in concert to gate access to a port downstream of the locking element 616, such as a port of the pattern generator 210 as illustrated in FIG. 5.

The arrangement of the logic gates (e.g., the AND gate 620 and the OR gate 624) of the locking element 616 are changeable such that different locking elements have different or the same unlock codes.

Referring back to FIG. 1, by employing the system 100, inclusion of the BLIS logic 136 enables detection of a modification to the IC design 104. In particular, changes to the IP core 146 would cause changes to signatures (responses) to the pseudo random patterns generated for particular seeds. Accordingly, inclusion of the BLIS logic 136 can curtail misappropriation of IP in the IP core 146 (e.g., counter fitting, as well as the malicious insertion of logic gates). Further, inclusion of the locking mechanism 194 can prevent unauthorized operation of the BLIS logic 136 to curtail reverse engineering and/or cloning of the IC design 104.

Furthermore, inclusion of the BLIS logic 136 does not significantly impact the design flow of the IC design 104. In particular, inclusion of the BLIS logic 136 provides a one-pass synthesis and implementation flow, because certain elements used in the BLIS logic 136, such as the scan chain array 150, which are already present in the IC design 104 as DFT elements to test operation of the virtual IC chip 108 and the fabricated IC chip 142. That is, function of the DFT elements, including the scan chain array 150 and the TAP 170 are leveraged to enable operation of the BLIS logic 136. Moreover, augmenting the IC design 104 with the BLIS logic 136 does not significantly impact the operational performance of the fabricated IC chip 142. Adding features for the BLIS pattern generator 162 and the BLIS security signature register 182 to enable the BLIS logic 136 adds a nominal amount of logic to the IC design 104, such that an impact on the performance power and area (PPA) of the IC design 104 through the addition of the BLIS logic 136 is curtailed. Thus, by employment of the system 100, the IC design 104 can be augmented with the BLIS logic 136 to enable the detection of modification to the IC design 104 without a substantial impact on the operational performance of the fabricated IC chip 142 and without significantly changing the design flow for the IC design 104.

Figure 7:
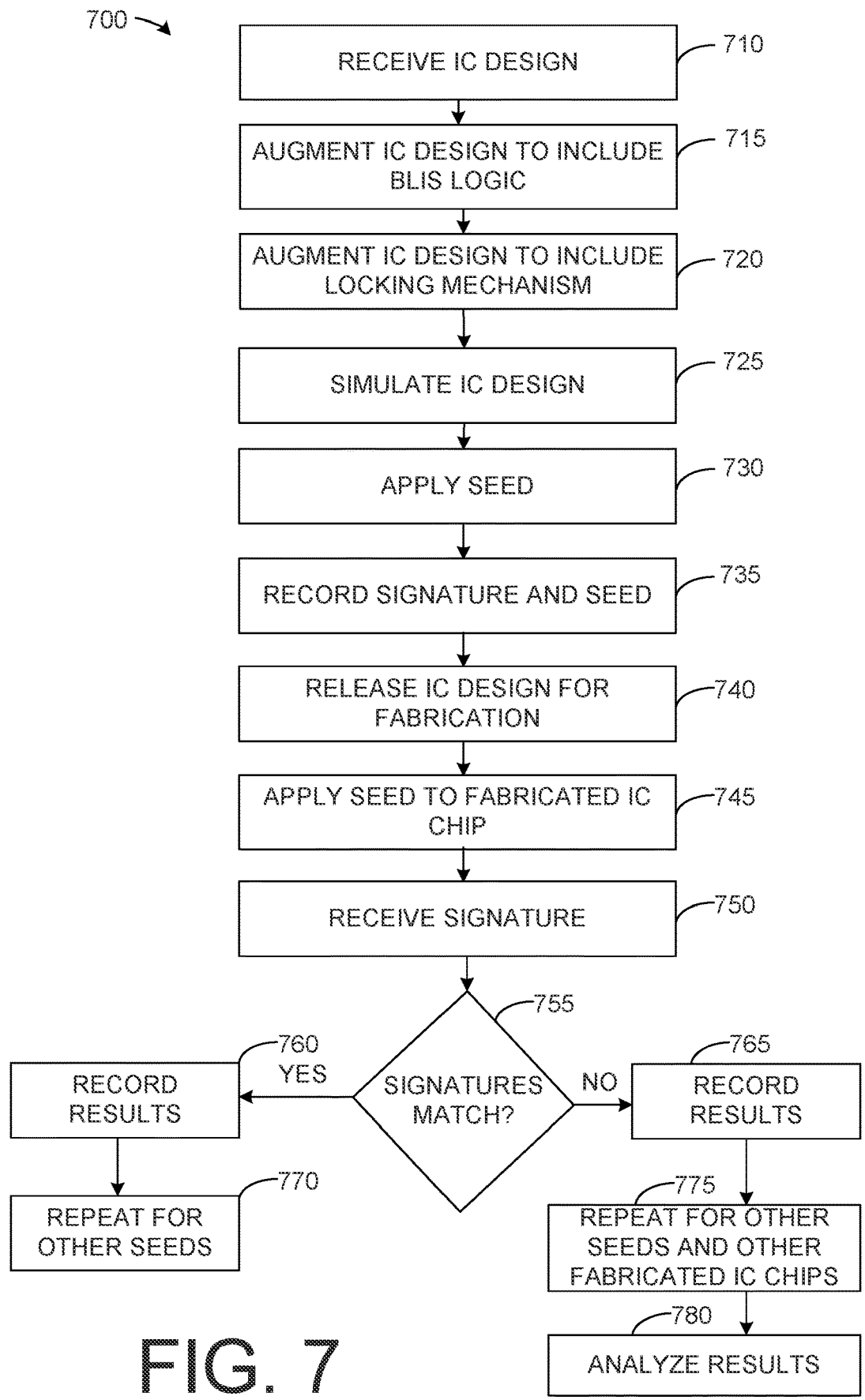
FIG. 7 illustrates a flowchart of an example method for detecting a modification to an IC design employed to fabricate an IC chip.

In view of the foregoing structural and functional features described above, an example method will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 7 illustrates a flowchart of an example method 700 for detecting a modification to an IC design employed to fabricate an IC chip. The method 700 can be implemented with the system 100 of FIG. 1. At 710, an EDA application (e.g., the EDA application 134 of FIG. 1) receives the IC design (e.g., the IC design 104 of FIG. 1). The IC design includes an IP core that executes logical operations to perform a function. The IC design also includes DFT elements, such as a scan chain array (e.g., the scan chain array 150 of FIG. 1) for testing the IP core. Each scan chain (e.g., the scan chains 152 of FIG. 1) in the scan chain array have an input scan flop and an output scan flop.

At 715, the EDA application augments the IC design to include BLIS logic (e.g., the BLIS logic 136 of FIG. 1). The BLIS logic includes a BLIS pattern generator (e.g., the BLIS pattern generator 162 of FIG. 1) and a BLIS security signature register (e.g., the BLIS security signature register 182 of FIG. 1). The BLIS pattern generator includes a PRPG that provides a pseudo random pattern based on a seed and a spreader network (e.g., the 2D spreader network 176 of FIG. 1) coupled between the PRPG and the input scan flops of the set of scan chains. The spreader network applies a first pseudo random code that is applied to a first edge of a die of the IC chip and a second pseudo random code that is applied to a second edge of the die of the IC chip in response to the pseudo random pattern. The spreader network also combines the first and second code to form a 2D code that is applied to the scan chain array. The BLIS security signature register includes a BLIS security signature register coupled to the output scan flops of the scan chain array that receives a 2D response (e.g., a 2D array of logical values) from the scan chain array that is generated in response to the 2D code. The BLIS security signature register combines logical values in the 2D response to output a signature for the IP core that corresponds to the seed.

At 720, the EDA application augments the IC design to include a locking mechanism (e.g., the locking mechanism 194 of FIG. 1). Accordingly, the locking mechanism includes a set of locking elements that gate access to the PRPG, the spreader network and the BLIS signature register. The locking mechanism also includes a lock interface that controls a state of the locking elements based on a presence or absence of an authentication key.

At 725, the EDA application simulates the IC design to provide a virtual IC chip based on the IC design. At 730, the EDA application applies the seed to the PRPG of the virtual IC chip. At 730, the EDA application receives a signature generated by the virtual IC chip in response to a pseudo random pattern generated by the PRPG in response to the seed. At 735, the EDA application stores a correspondence between the seed and the signature in BLIS data. Moreover, the operations of 710-735 are repeatable to generate a set of seeds and corresponding signatures.

At 740, the IC design is released for fabrication (e.g., to an untrusted foundry). At 745, ATE applies the seed to the PRPG of the fabricated IC chip. At 750, the EDA application (or another application) receives the signature generated by the fabricated IC chip in response to a corresponding pseudo random pattern generated based on the seed. At 755 a determination is made as to whether the signature from the fabricated IC chip matches the signature from the virtual IC chip for the same seed. If the determination at 755 is positive (e.g., YES), the method proceeds to 760. If the determination at 760 is negative (e.g., NO), the method proceeds to 765.

At 760, the results (a matching signature) are recorded for the fabricated IC chip, and the method proceeds to 770. At 770, the operations of 745-755 are repeated for other seeds. In situations where the signatures for the IC chip and the virtual IC chip match for every seed in the set of seeds, it is presumed that the IC design was not modified prior to the fabrication of the fabricated IC chip.

At 765, the results (mismatched signatures) are recorded. At 775, the operations of 745-755 are repeated for other seeds and for other instances of the fabricated IC chip. At 780, the recorded results are analyzed. In particular, if the mismatched signatures are inconsistent between the fabricated IC chips, it can be determined that the IC design was not modified prior to fabrication of the IC chip, and that the mismatched signatures are likely caused by stuck-at and/or delay faults/defects in the various fabricated IC chips. Conversely, if the results are consistent (e.g., each instance of the IC chip has the same mismatched signature for the same seed), it can be determined that it is likely the IC design was modified in an unauthorized fashion prior to fabrication of the fabricated IC chip.

Figure 8:
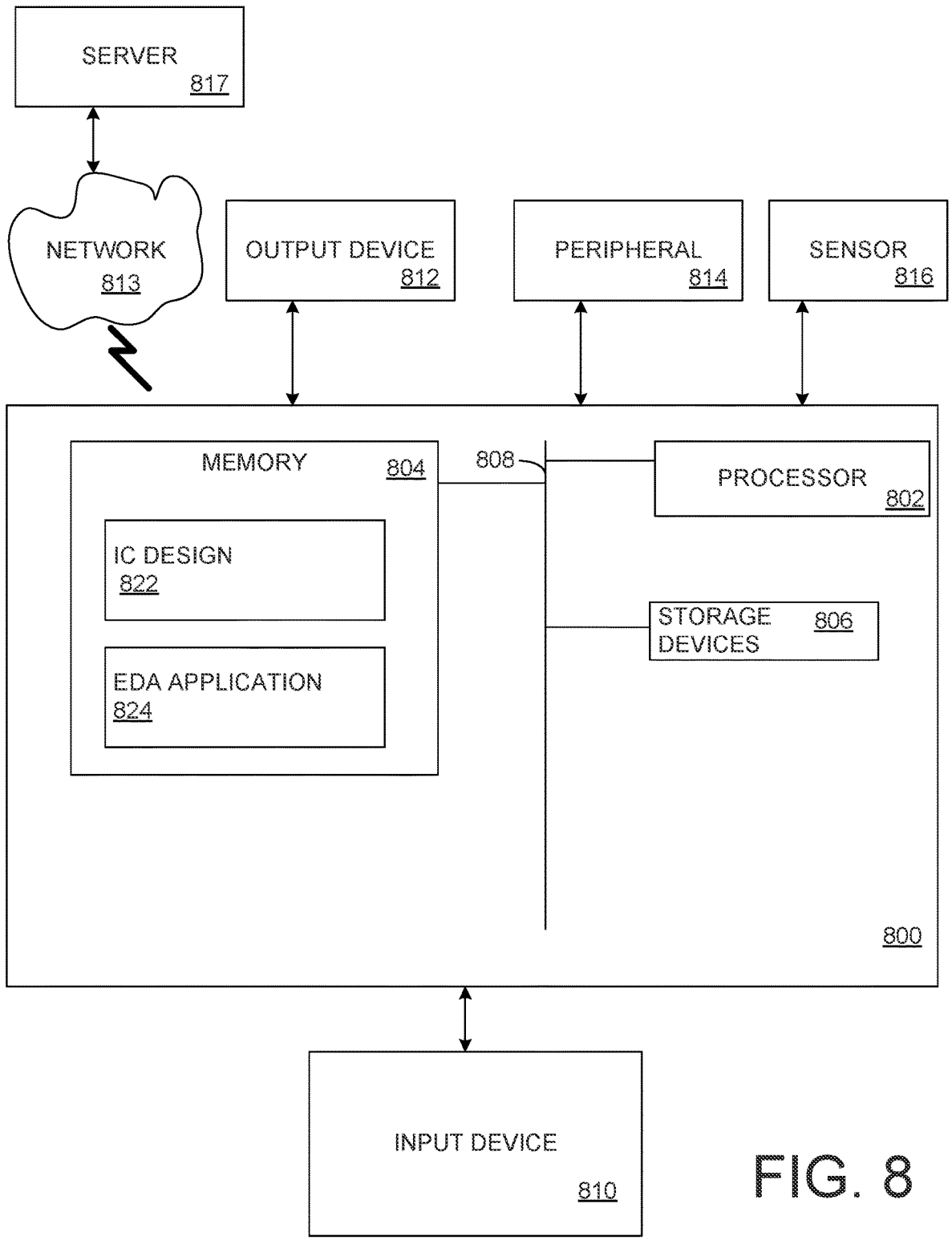
FIG. 8 illustrates an example of a computing system employable to augment an IC design.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. As shown in FIG. 8, the computing system 800 can include a computer processor 802, associated memory 804 (e.g., RAM), cache memory, flash memory, etc.), one or more storage devices 806 (e.g., a solid state drive, a hard disk drive, an optical drive such as a compact disk (CD) drive or digital versatile disk (DVD) drive, a flash memory stick, etc.) and numerous other elements and functionalities. The computer processor 802 may be an IC chip for processing instructions. For example, the computer processor may be one or more cores, or micro-cores of a processor. Components of the computing system 800 can communicate over a data bus 808.

The computing system 800 may also include an input device 810, such as any combination of one or more of a touchscreen, keyboard, mouse, microphone, touchpad, electronic pen, or any other input device. Further, the computing system 800 can include an output device 812, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 812 can be the same physical device as the input device 810. In other examples, the output device 812 and the input device 810 can be implemented as separate physical devices. The computing system 800 can be connected to a network 813 (e.g., LAN, a wide area network (WAN) such as the Internet, a mobile network, or any other type of network) via a network interface connection (not shown). The input device 810 and output device(s) 812 can be connected locally and/or remotely (e.g., via the network 813) to the computer processor 802, the memory 804 and/or the storage devices 806. Many different types of computing systems exist, and the aforementioned input device 810 and the output device 812 can take other forms. The computing system 800 can further include a peripheral 814 and a sensor 816 for interacting with the environment of the computing system 800 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 800 can communicate with a server 817 via the network 813.

The memory 804 can include an IC design 822 that is instantiated as a virtual IC chip operating on a platform provided by an EDA application 824 or as a fabricated IC chip. The EDA application 824 is employable to augment the IC design 822 with BLIS logic and a locking mechanism to detect modifications to the IC design 822 prior to fabrication of an IC chip.

Further, one or more elements of the aforementioned computing system 800 can be located at a remote location and connected to the other elements over a network 813 (e.g., in a computing cloud). Additionally, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on "means based at least in part on". Additionally, where the disclosure or claims recite "a," "an," "a first," or "another" element, or the equivalent thereof, it should be interpreted to include one or more than one such element, neither requiring nor excluding two or more such elements.

What is claimed is:

1. An integrated circuit (IC) chip comprising:
    an intellectual property (IP) core that executes logical operations to perform a function;
    a scan chain array for testing the IP core, each scan chain in the scan chain array having an input scan flop and an output scan flop;
    a pseudo random pattern generator (PRPG) that provides a pseudo random pattern based on a seed;
    a spreader network coupled between the PRPG and the input scan flops of the scan chain array, that:
        applies a first pseudo random code to a first edge of a die of the IC chip and a second pseudo random code to a second edge of the die of the IC chip in response to the pseudo random pattern; and
        combines the first and second code to form a two-dimensional (2D) code that is applied to the scan chain array; and
    a BLIS security signature register coupled to the output scan flops of the scan chain array that:
        receives a 2D response from the scan chain array that is generated in response to the 2D code; and
        combines logical values in the 2D response to output a signature for the IP core that corresponds to the seed that is employable to detect changes to an IC design for the IC chip.

2. The IC chip of claim 1, wherein the spreader network comprises:
    a row spreader network that outputs the first pseudo random code having a first bit length in response to the pseudo random pattern along a first set of signal paths that extend in a first direction;
    a column spreader network that provides a second pseudo random code having a second bit length in response to the pseudo random pattern along a second set of signal paths that extend in a second direction normal to the first direction; and
    a set of XOR gates logically situated at intersections of the first signal paths and the second signal paths, wherein a given XOR gate of the set of XOR gates has a first input coupled to a signal path of the first set of signal paths and a second signal path coupled to a signal path of the second set of signal paths, and an output of the given XOR gate is coupled to a given input scan flop of a given scan chain of the scan chain array.

3. The IC chip of claim 2, wherein the set of XOR gates is a first set of XOR gates, and the BLIS security signature register comprises:
    a compactor network comprising:
        a row compactor network that receives signals propagating along a third set of signal paths that extend in the second direction;
        a column compactor network that receives signals propagating along a fourth set of signal paths that extend in the first direction;
        a second set of XOR gates logically situated at intersections of a set of third signal paths and the fourth signal paths, wherein:
            a first input of each XOR gate in the second set of XOR gates is coupled to a respective output scan flop of the scan chain array;
            a second input of a first subset of the second set of XOR gate flops has a second input coupled to a given neighboring XOR gate in the second set of XOR gates; and
            a third input of a second subset of the second set of XOR gates has a third input coupled to another neighboring XOR gate of the set of XOR gates, and the second subset of the second set of XOR gates is a subset of the first subset of the second set of XOR gates; and
        a multiple input signature register (MISR) that captures the signature output by the compactor network.

4. The IC chip of claim 3, wherein the row compactor comprises gate logic that applies a first code received at the third set of signals to the gate logic of the row compactor to generate a first portion of the signature of the IP core.

5. The IC chip of claim 4, wherein the column compactor comprises gate logic that applies a second code received at the fourth set of signals to the gate logic of the column compactor to generate a second portion of the signature of the IP core.

6. The IC chip of claim 5, wherein the MISR of the row compactor and the column compactor is a by-passable MISR.

7. The IC chip of claim 4, wherein signal paths for the third set of signals and the fourth set of signals include pipeline stages to compensate for propagation delay.

8. The IC chip of claim 1, further comprising a locking mechanism to control communications with the PRPG and the BLIS security signature register, wherein the locking mechanism comprises:
    a set of locking elements that gate access to input ports of the PRPG and to output ports of the BLIS security signature register; and
    a lock interface that controls a state of the set of locking elements based on a presence or an absence of an authentication key.

9. The IC chip of claim 8, wherein the lock interface provides an unlock code to the set of locking elements in response to authentication of the authentication key, wherein the unlock code for the set of locking elements is stored in an internal shift register of the lock interface, and the lock interface provides a lock code to the set of locking elements unless the authentication key is authenticated.

10. The IC chip of claim 9, wherein the set of locking elements operate in an unlocked state in response to the unlock code, such that the locking elements pass a logical value at a respective input to a respective output.

11. The IC chip of claim 9, wherein the set of locking elements operate in a locked state in response to the lock code, such that the locking elements output a logical value that is independent of a corresponding input logical value.

12. The IC chip of claim 9, wherein the IP core is a given IP core and the signature is a given signature, and the given signature of the given IP core is compared to another signature for another IP core to determine whether the given IP core has been modified.

13. A system comprising:
a non-transitory memory that stores machine-readable instructions; and
a processing unit that accesses the memory and executes the machine-readable instructions, the machine-readable instructions comprising a security engine that:
receives an integrated circuit (IC) chip design comprising:
an IP core for executing a function;
a scan chain array for testing an IC chip based on the IC design, wherein the scan chain array comprises a plurality of scan chains with input scan flops and output scan flops;
augments the IC design to add built-in logic instruction detection (BLIS) logic for detecting modification of the IP core, the logic comprising:
a pseudo random pattern generator (PRPG) that provides a pseudo random pattern based on a seed;
a spreader network coupled between the PRPG and the input scan flops of the scan chain array that:
applies a first pseudo random code that is applied to a first edge of a die of the IC chip and a second pseudo random code that is applied to a second edge of the die of the IC chip in response to the pseudo random pattern; and
combines the first and second code to form a two-dimensional (2D) code that is applied to the scan chain array; and
a BLIS security signature register coupled to the output scan flops of the scan chain array that:
receives a 2D response from the scan chain array that is generated in response to the 2D code; and
combines logical values in the 2D response to output a signature for the IP core that corresponds to the seed.

14. The system of claim 13, wherein the spreader network comprises:
a row spreader network that provides a first pseudo random code having a first bit length in response to the pseudo random pattern along a first set of signal paths that extend in a first direction;
a column spreader network that provides a second pseudo random code having a second bit length in response to the pseudo random pattern along a second set of signal paths that extend in a second direction normal to the first direction; and
a set of XOR gates logically situated at intersections of the first signal paths and the second signal paths, wherein a given XOR gate of the set of XOR gates has a first input coupled to a signal path of the first set of signal paths and a second signal path coupled to a signal path of the second set of signal paths, and an output of the given XOR gate is coupled to a given input scan flop of a given scan chain in the scan chain array.

15. The system of claim 14, wherein the set of XOR gates is a first set of XOR gates, and the BLIS security signature register comprises:
a compactor network comprising:
a row compactor network that receives signals propagating along a third set of signal paths that extend in the second direction;
a column compactor network that receives signals propagating along a fourth set of signal paths that extend in the first direction;
a second set of XOR gates logically situated at intersections of the third signal paths and the fourth signal paths, wherein:
a first input of each XOR gate in the second set of XOR gates is coupled to a respective output scan flop of the set of scan chains;
a second input of a first subset of the second set of XOR gate flops has a second input coupled to a given neighboring XOR gate in the second set of XOR gates; and
a third input of a second subset of the second set of XOR gates has a third input coupled to another neighboring XOR gate of the second set of XOR gates, and the second subset of the second set of XOR gates is a subset of the first subset of the second set of XOR gates; and
a multiple input signature register (MISR) that captures an output of the compactor network, wherein the captured output corresponds to the signature of the IP core for the seed.

16. The system of claim 15, wherein the row compactor comprises gate logic that applies a first code received at the third set of signals to the gate logic of the row compactor to generate a first portion of the signature of the IP core, and the column compactor comprises gate logic that applies a second code received at the fourth set of signals to the gate logic of the column compactor to generate a second portion of the signature of the IP core.

17. The system of claim 14, where the IC design comprises a locking mechanism to control communications with the PRPG and the BLIS security signature register, wherein the locking mechanism comprises:
a set of locking elements that gate access to input ports of the PRPG and to output ports of the BLIS security signature register; and
a lock interface that controls a state of the set of locking elements based on a presence or an absence of an authentication key.

18. A method for detecting a modification to an integrated circuit (IC) design for fabrication, the method comprising:
receiving, by an electronic design automation (EDA) application executing on a computing platform, the IC design, wherein the IC design comprises:
an intellectual property (IP) core that executes logical operations to perform a function; and
a scan chain array for testing the IP core, the scan chain array comprising scan chains having input scan flops and output scan flops;
augmenting, by the EDA application, the IC design with built-in logic instruction detection (BLIS) logic, the BLIS logic comprising:
a pseudo random pattern generator (PRPG) that provides a pseudo random pattern based on a seed;
a spreader network coupled between the PRPG and the input scan flops of the scan chain array that:
applies a first pseudo random code to a first edge of a die of an IC chip based on the IC design and a second pseudo random code to a second edge of the die of the IC chip in response to the pseudo random pattern; and
combines the first and second code to form a two-dimensional (2D) code that is applied to the scan chain array; and
a BLIS security signature register coupled to the output scan flops of the scan chain array that:
receives a 2D response from the scan chain array that is generated in response to the 2D code; and combines logical values in the 2D response to output a signature for the IP core that corresponds to the seed; and simulating, by the EDA application, the IC design to provide a virtual IC chip based on the IC design;

applying, by the EDA application, the seed to the PRPG of the virtual IC chip;

receiving, by the EDA application, a signature generated by the virtual IC chip in response to a pseudo random pattern generated by the PRPG in response to the seed; and storing, in BLIS data, a correspondence between the seed and the signature for the IC design.

19. The method of claim 18, wherein the augmenting further comprises adding a locking mechanism to the IC design, the locking mechanism comprising:

a set of locking elements that gates access to the PRPG and the BLIS signature register; and a lock interface that controls a state of the locking elements based on a presence or absence of an authentication key.

20. The method of claim 18, further comprising:

providing the seed to a fabricated IC chip that is based on the IC design;

receiving a signature for a pseudo random pattern generated by the fabricated IC chip in response to the seed; and comparing the signature provided from the fabricated IC chip to the signature provided from the virtual IC chip to determine if the IC design was modified prior to fabricating the fabricated IC chip.

\* \* \* \* \*